United States Patent [19]

Satomi et al.

[11] Patent Number: 5,048,078

[45] Date of Patent: Sep. 10, 1991

[54] SYSTEM FOR COMMUNICATION OVER A TELEPHONE LINE BETWEEN A FACSIMILE APPARATUS AND A COMPUTER

[75] Inventors: Mitsuo Satomi, Kyoto; Masahiro Utsumi, Joyo, both of Japan

[73] Assignee: Murata Kikai Kabushiki Kaisha, Kyoto, Japan

[21] Appl. No.: 372,873

[22] Filed: Jun. 26, 1989

[30] Foreign Application Priority Data

Jul. 1, 1988 [JP] Japan .................................. 63-164213

[51] Int. Cl.$^5$ ............................................ H04M 11/00
[52] U.S. Cl. ...................................... 379/100; 379/93
[58] Field of Search ............... 358/434, 425, 437, 442, 358/435; 379/93, 100, 67

[56] References Cited

U.S. PATENT DOCUMENTS

| | | | |
|---|---|---|---|
| 4,356,545 | 10/1982 | West | 379/93 |
| 4,481,574 | 11/1984 | DeFino et al. | 379/93 |
| 4,631,598 | 12/1986 | Burkhardt et al. | 358/425 |
| 4,652,933 | 3/1987 | Koshiishi | 358/434 |
| 4,656,318 | 4/1987 | Noyes | 379/93 |
| 4,672,460 | 5/1987 | Tsuda | 358/437 |
| 4,729,033 | 3/1988 | Yoshida | 358/435 |
| 4,736,249 | 4/1988 | Iizuka et al. | 358/442 |
| 4,788,709 | 11/1988 | matsumoto | 379/100 |
| 4,794,637 | 12/1988 | hashimoto | 379/67 |
| 4,802,204 | 1/1989 | Chang | 379/100 |
| 4,816,911 | 3/1989 | Kirsch et al. | 358/400 |
| 4,893,335 | 1/1990 | Fuller et al. | 379/67 |

FOREIGN PATENT DOCUMENTS 0140844  6/1989  Japan .................................. 379/100

OTHER PUBLICATIONS

Telephony magazine, Aug. 18, 1986, p. 85.

Primary Examiner—Jin F. Ng
Assistant Examiner—Ahmad F. Matar
Attorney, Agent, or Firm—Spensley Horn Jubas & Lubitz

[57] ABSTRACT

A facsimile communication system comprises a facsimile unit and a host computer which is connected to the facsimile unit through a telephone line, wherein settings of functions of the facsimile unit are read out or altered by input operations on the input unit of the host computer.

15 Claims, 5 Drawing Sheets

FIG. 1
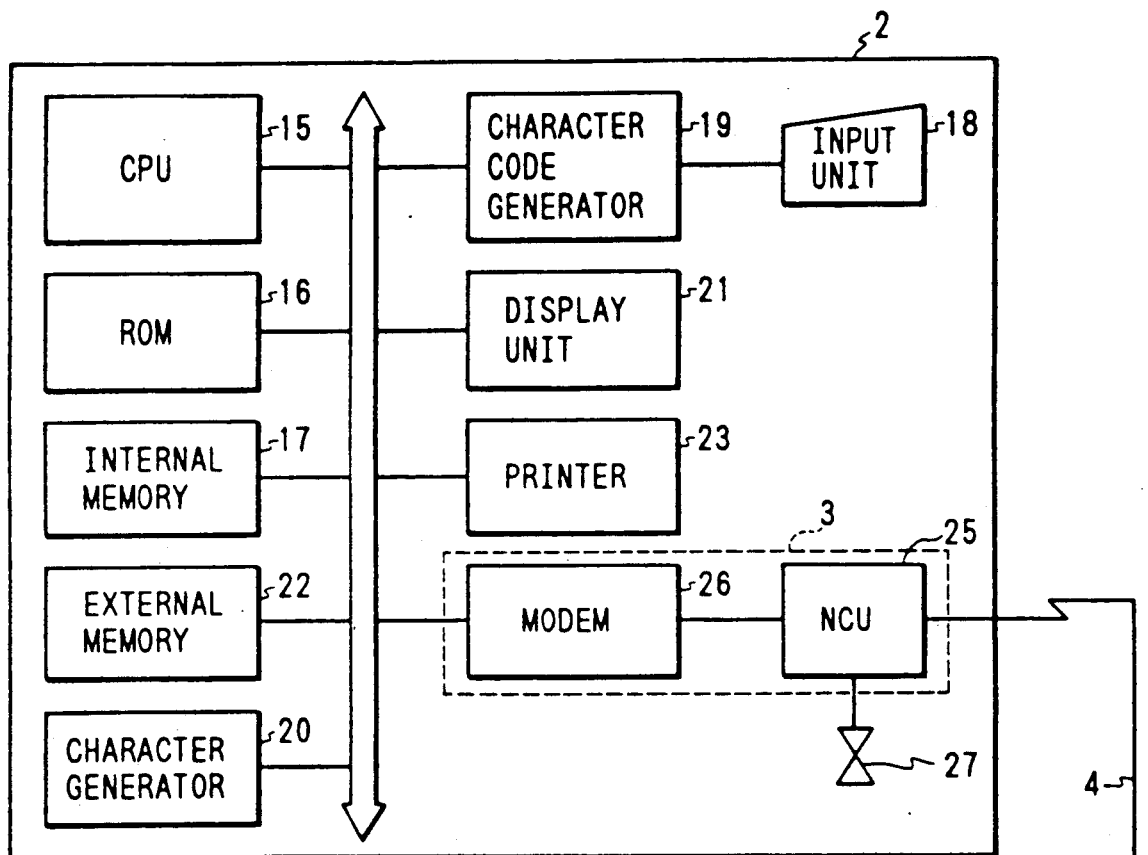
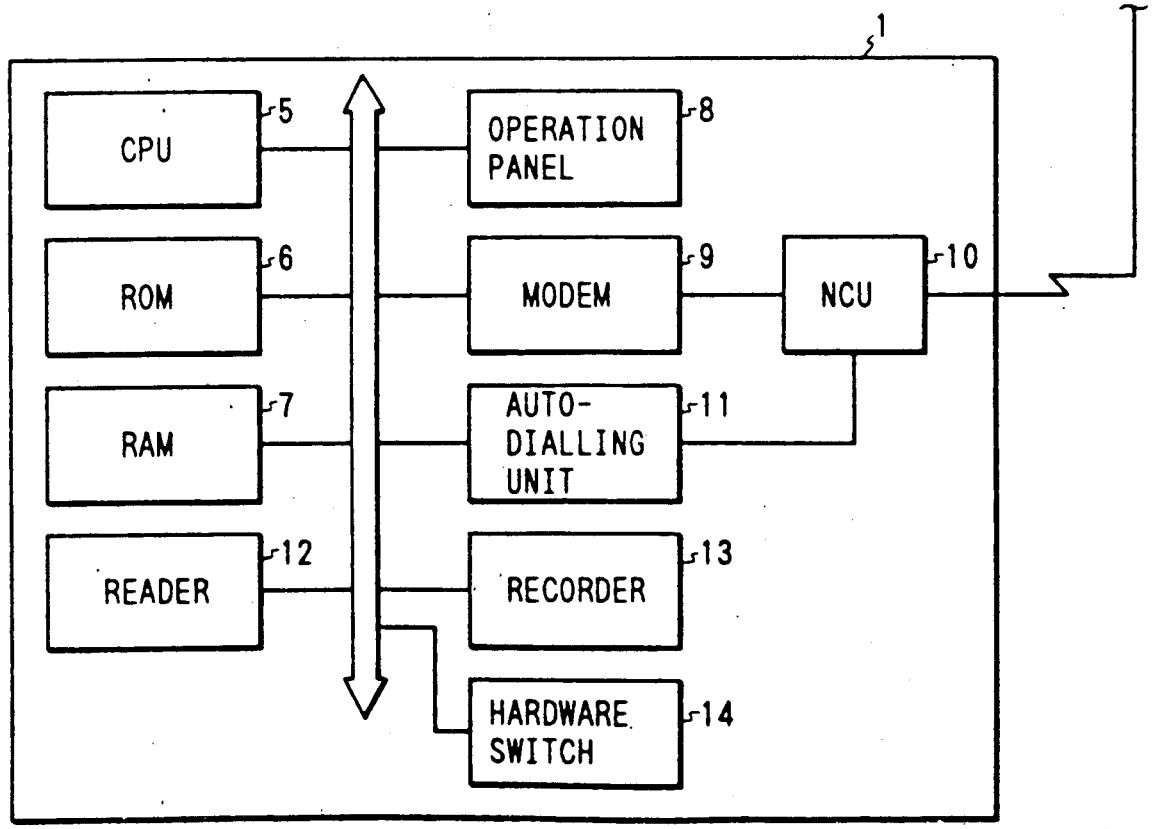

SYSTEM FOR COMMUNICATION OVER A TELEPHONE LINE BETWEEN A FACSIMILE APPARATUS AND A COMPUTER

FIELD OF THE INVENTION

The present invention relates to a communication system based on the facsimile.

RELATED ART STATEMENT

Facsimile units have been used for the transmission and reception of information through public telephone lines. In recent years, the demand for facsimile units has been increasing rapidly and they are being introduced to homes. A facsimile unit is provided with such functions as the sender registration function and auto-dial function, for example. Setting of these functions is implemented using input keys (e.g., one-touch key) on the operation panel of the facsimile unit.

Generally, the function setting operation is done by a service expert at the installation of the facsimile unit.

However, it is a very hard work for the service personel to visit home at installation of the facsimile unit, and it is troublesome for the service personel to visit home repeatedly at each alteration of settings during the ordinary use after installation.

It is awkward for users, particularly unskilled users, to implement the setting by themselves. An erroneous setting of the auto-dial function can invite a total malfunctioning of facsimile communication.

OBJECT AND SUMMARY OF THE INVENTION

It is an object of the present invention to provide a facsimile communication system which allows positive and easy setting of various functions equipped on the facsimile unit.

In order to achieve the above objective, an embodiment of the inventive facsimile communication system comprises a facsimile unit and a host computer which is connected to the facsimile unit through a telephone line, wherein settings of functions of the facsimile unit are read out or altered by input operations on the input unit of the host computer.

BRIEF DESCRIPTION OF THE DRAWINGS

FIG. 1 is a block diagram showing in brief a communication system in which an embodiment of the present invention is carried out.

DETAILED DESCRIPTION OF PREFERRED EMBODIMENTS

Figure 2:
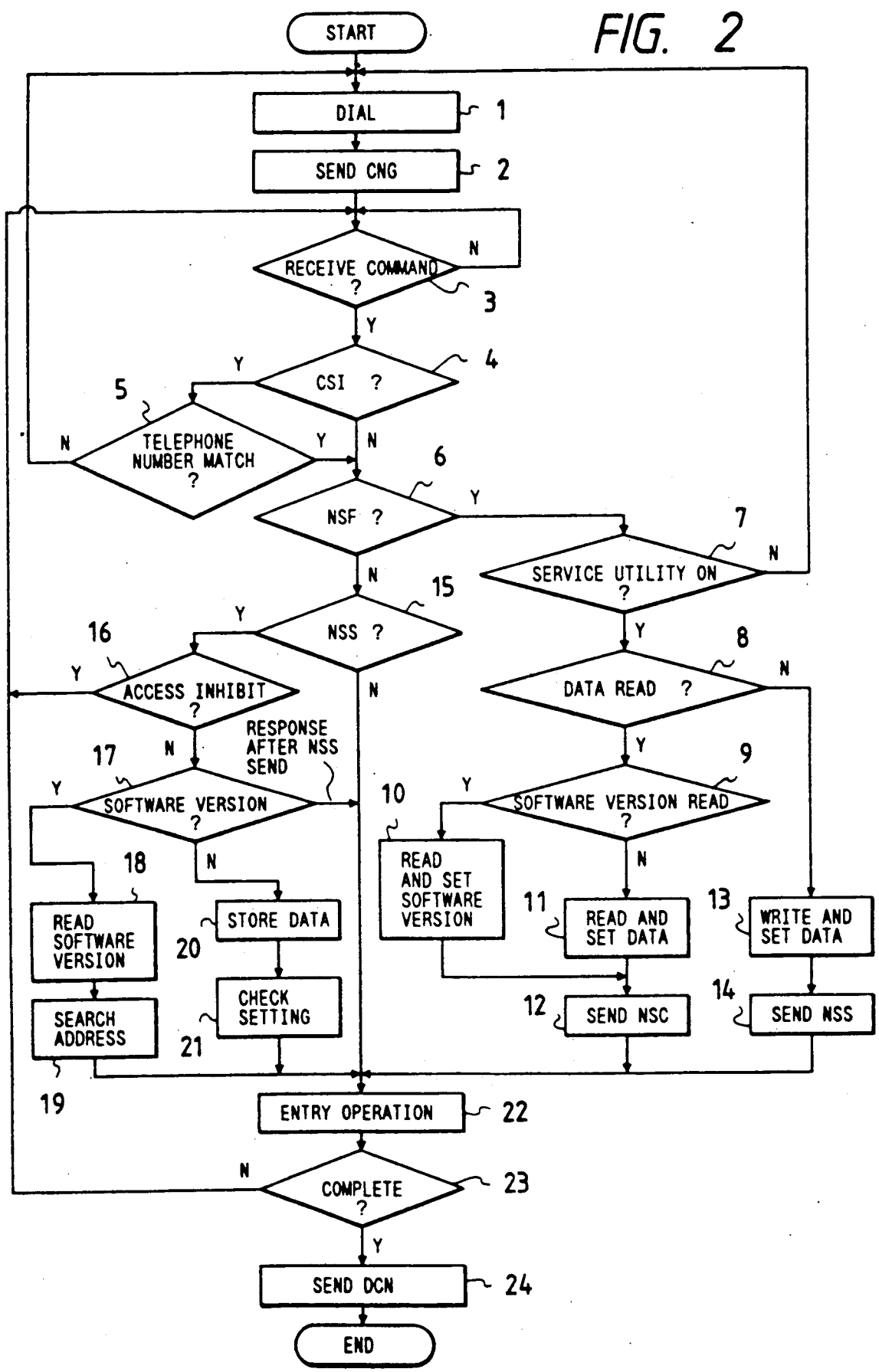
FIGS. 2 and 3 are flowcharts used to explain the operational procedures based on an embodiment of this invention.

A preferred embodiment of the inventive facsimile communication system will be described with reference to the accompanying drawings.

FIG. 1 is a block diagram showing in brief a communication system to which an embodiment of the present invention is applied. Indicated by 1 is a facsimile unit having functions inherent to the facsimile, and it is installed as a customer's facility. 2 is a host computer equipped with a facsimile interface 3 and other peripheral devices, and it is installed in the control center room. The facsimile unit 1 and the host computer 2 are connected through a telephone line 4.

First, the facsimile unit 1 will be explained. Indicated by 5 is a main controller, i.e., CPU, consisting of a microcomputer, 6 is a ROM in which the operational program, etc. are stored, and 7 is a RAM for storing various data created in the progression of the program and such information as sender's names and auto-dial numbers. The RAM 7 is backed-up by a battery. 8 is an operation panel used for various input operations for the send/receive commands, etc.

Indicated by 9 is a modulator/demodulator, i.e., modem, and 10 is a network control unit, i.e., NCU, through which the modem 9 is connected to the telephone line 4. 11 is an auto-dialing unit, 12 is a reader which scans a text to be sent and converts the text image into an electrical binary signal representing white or black, 13 is a recorder which prints received image data on a piece of recording paper, and 14 is a hardware dip switch.

Next, the host computer 2 will be explained. Indicated by 15 is a CPU, 16 is a ROM which stores the operational program of the host computer 2, 17 is an internal memory which stores various data, and 18 is an input unit, such as a keyboard, capable of entering character data. Character data and various commands entered through the input unit are coded into respective character codes by a character code generator 19. 20 is a known character generator which converts a character code into a character pattern signal, 21 is a display unit such as a CRT unit or LCD unit, 22 is an external memory such as a floppy disk unit, and 23 is a printer. The facsimile interface 3 consists of a network controller, i.e., NCU, 25 connected to the telephone line 4 and a modulator/demodulator, i.e., modem, 26, and signal transaction takes place between the facsimile unit 1 and the host computer 2 through the facsimile interface 3. Indicated by 27 is a telephone set which is connected to the NCU 25.

Next, setting of various functions of the above communication system will be described in detail. In the facsimile unit 1, the ROM 6 and RAM 7 have their address map 30 arranged such that an area with an address range from 0000H to 8000H is assigned to the ROM 6 and an area with an address range from 8000H to FFFFH is assigned to the RAM 7. The present invention, however, is not confined to this memory address arrangement of this illustrated embodiment.

The following Table 1 shows an example of settings of functions stored in the ROM 6 and RAM 7.

TABLE 1

| Record | Item | Read/Write | Accessibility |
| --- | --- | --- | --- |
| a | Software version | Read only | Disabled |
| b | Software dip switch | Read/write | Disabled |
| c | Auto-dial information | Read/write | Enabled |
| d | Sender registration | Read/write | Enabled |
| e | Communication report | Read only | Enabled |

In Table 1, the record a of software version contains the model name of the facsimile unit, type version number, etc., the record b of software switch contains switching data used for the switching of the telephone line, etc., the record c of auto-dial information contains abbreviated dial numbers, destination telephone numbers, etc., the record d of sender registration contains the user's name, firm's name, etc., and the record e contains the facsimile send/receive status.

The records a, b, c, d and e are set in advance to inhibit writing, and records a and e meet this case. The user of the facsimile unit 1 can set for the selection of access inhibition for the security purpose, and records c, d and e meet this case. The selection of access inhibition can readily be set by the user on the hardware dip switch 14 provided in the facsimile unit 1.

Although the embodiment will be explained in the following for an example in which the auto-dial information record c in the facsimile unit 1 is set from the host computer 2 over the telephone line 4, the present invention is of course not confined to the setting of the auto-dial information c.

In general, the auto-dial function performs such that a destination telephone number is preset in advance along with an abbreviated number of several digits, and, at calling, the auto-dialing unit 11 loads the destination telephone number, which has been entered (registered) in advance in the RAM 7, in response to the operation of the abbreviated number, provides a pulse signal corresponding to the telephone number for the NCU 10, which then sends the pulse signal over the telephone line 4 for line connection, thereby establishing the communication with the destination party. At the setting operation, the name of destination party is also registered besides its telephone number.

Figure 5:
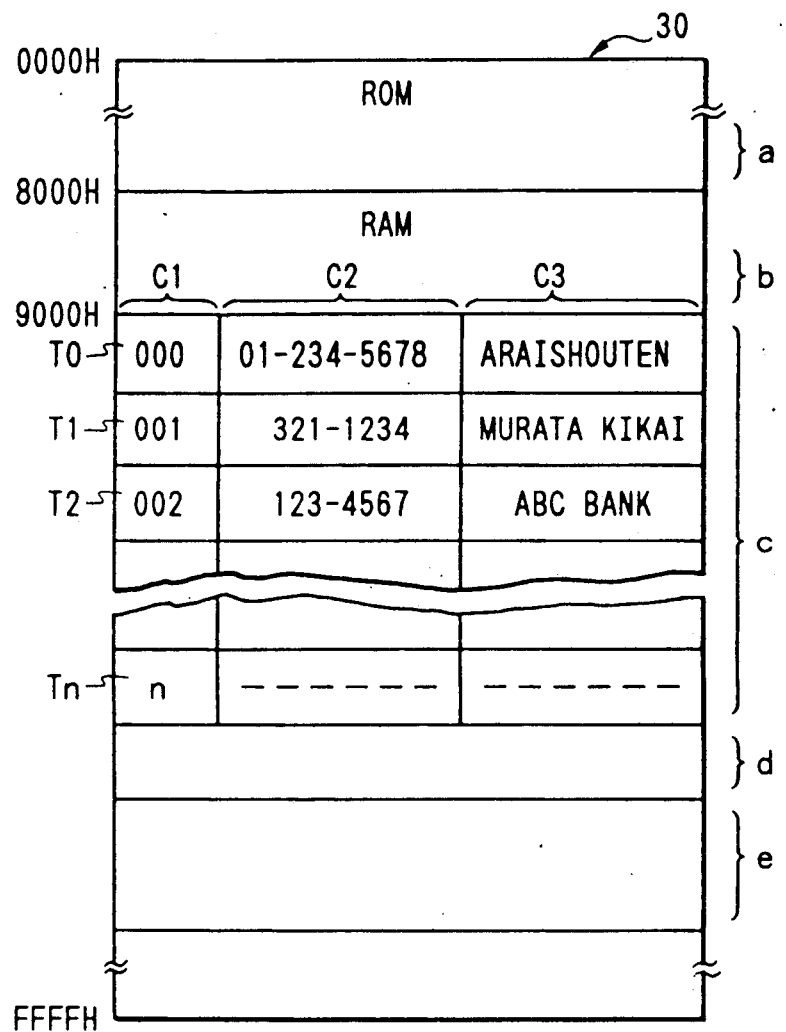
FIG. 5 is a diagram showing, as an example, the storage areas of the ROM and RAM incorporated in a facsimile unit.

In FIG. 5, depicted by $T_0$ through $T_n$ are an example of the destination information table stored in the auto-dial information record c in the RAM 7. A field C1 contains the abbreviated number, a field C2 contains the destination telephone number, and a field C3 contains the name of destination party.

In the host computer 2, character data and various commands entered through the input unit 18 are converted by the character code generator 19 into a corresponding character code, i.e., in ASCII code or binary code, and after being controlled by the CPU 15 and modulated by the modem 26, it is sent through the NCU 25 over the telephone line 4.

In the facsimile unit 1, a character code sent over the telephone line 4 is received through the NCU 10 and demodulated by the modem 9, and, by being controlled by the CPU 5, it is stored in the specified field in the RAM 7.

Figure 6:
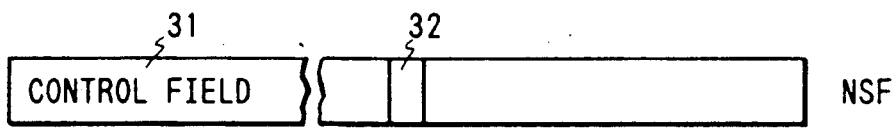
FIGS. 6, 7 and 8 are diagrams explaining in brief, as an example, the format of a control signal frame.
Figure 7:
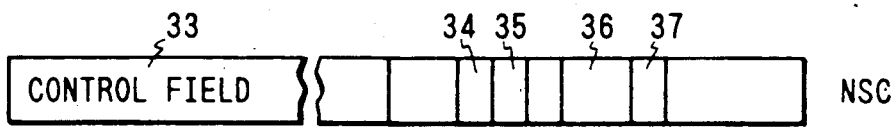
Figure 8:
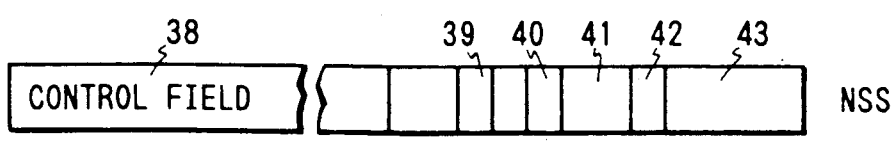

Next, the control signals used for the transaction of the character code, etc. will be explained. FIGS. 6, 7 and 8 are diagrams showing the format of the control signal frame embodying the present invention.

FIG. 6 shows a non-standard function identification signal (NSF) indicative of an optional function, and it includes a control field 31 necessary for the usual facsimile communication, and a service utility function field 32 which indicates whether or not the inventive communication system is operative. FIG. 7 shows a non-standard function command signal (NSC), in which are included a control field 33, a data read/write field 34 which designates data reading or writing, a software version field 35 which designates reading of the software version a, a start address field 36 which indicates the starting address of the memory for reading or writing, and a byte width field 37 which indicates the number of bytes of data necessary for reading or writing from the starting address of the memory. FIG. 8 shows a non-standard function setting signal (NSS), in which are included an access inhibit field 40 used for selecting the access inhibition, a start address field 41, a byte width field 42, and a data field or software version field 43. For the signal (NSS), if the host computer 2 makes access to a field which is access-inhibited in the facsimile unit 1, the facsimile unit 1 responds to this attempt to set the access inhibition field 40 to 1. In case access is allowed, the facsimile unit 1 responds to the access attempt to reset the access inhibition field to 0.

Next, the operation of an embodiment of inventive system will be explained.

Figure 3:
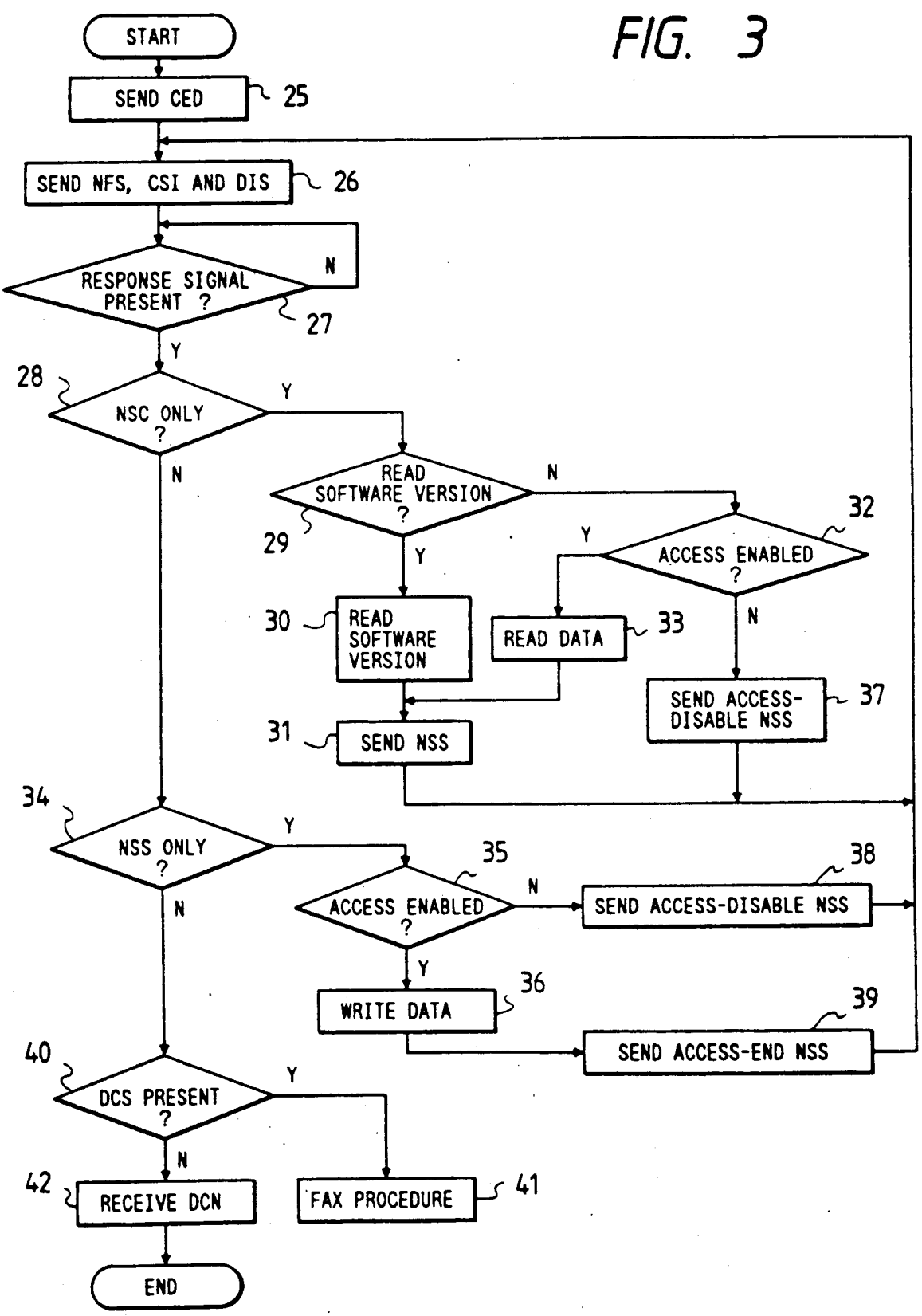
Figure 4:
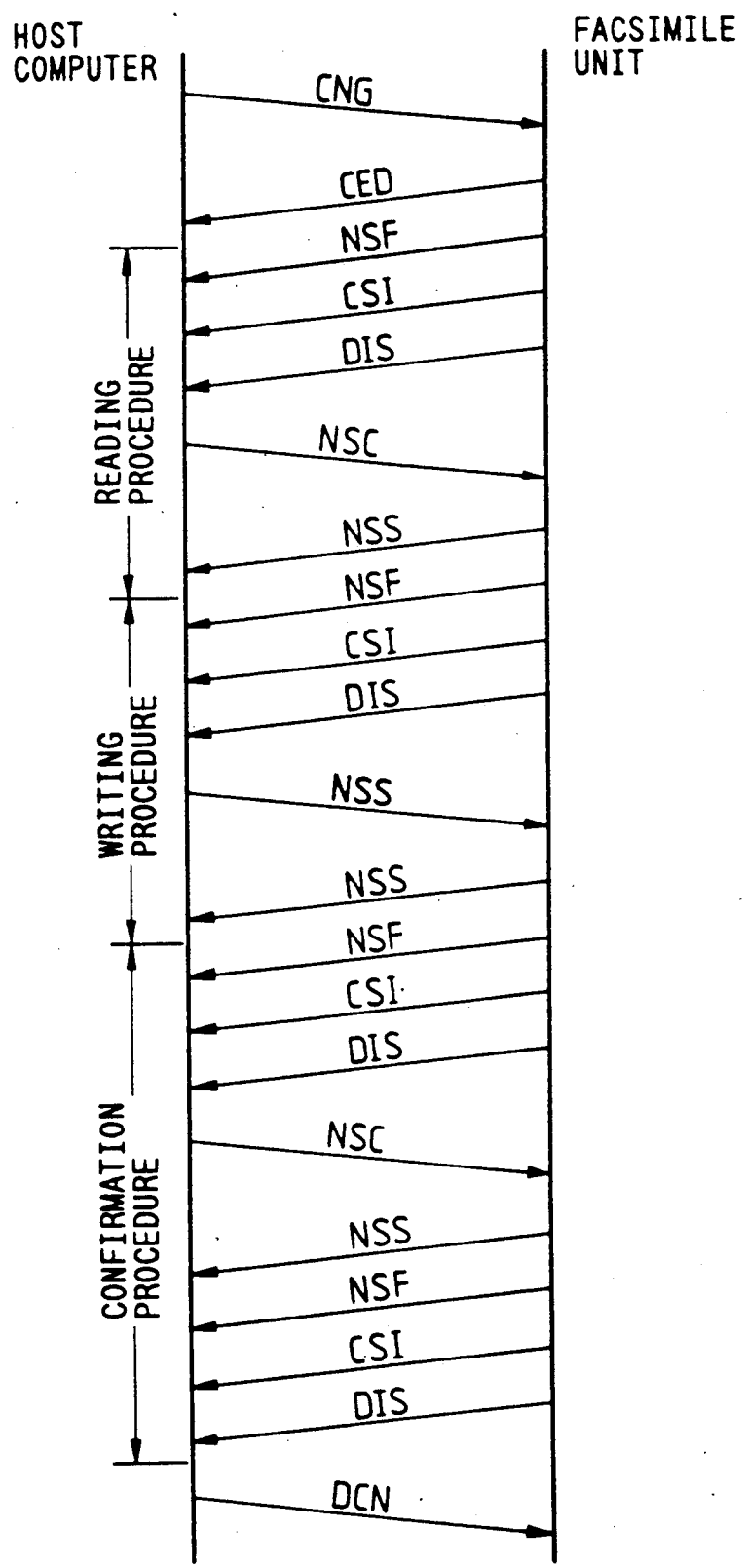
FIG. 4 is a diagram explaining in brief the communication procedure between a host computer and a facsimile unit.

FIG. 2 and FIG. 3 are flowcharts used to explain the operation of the host computer 2 and facsimile unit 1, respectively. FIG. 4 is a diagram explaining in brief the communication procedure between the host computer 2 and the facsimile unit 1.

The reading procedure will be explained first. When the operator operates the input unit 18 of the host computer 2 to issue the setting command and dials the number on the telephone set 27 or auto-dialing unit (not shown) so that the facsimile unit 1 is connected: (step 1), the host computer 2 sends a call signal CNG: (step 2) and the facsimile unit 1 sends a called exchange station identification signal CED indicating that the line is connected: (step 25). In addition, the facsimile unit 1 sends a non-standard function identification signal NSF indicative of the optional function, a called exchange station identification signal CSI indicative of the telephone number, etc., and a digital identification signal DIS indicative of the CCITT standard: (step 26).

The host computer 2, upon detecting the CSI signal by the CPU 15: (step 4), extracts the telephone number from the CSI signal and checks whether or not the number is equal to the telephone number which has been dialed in step 1: (step 5). Subsequently, the CPU detects the NSF signal: (step 6) and, if the service utility function field 32 of the NSF signal is set "1": (step 7), sets the software version field 35 of the non-standard function command signal NSC: (step 10) thereby to request the software version of the ROM 6: (step 9), and sends it to the facsimile unit 1: (step 12).

The facsimile unit 1, upon detecting the software version field 35 of the NSC signal by the CPU 5: (step 28), reads the software version a of the ROM 6: (step 29, step 30) and extracts the software version field 43 of the non-standard function setting signal NSS indicative of the optional function, and sends it to the host computer: (step 31).

Upon detecting the NSS signal by the CPU 15: (step 15), the host computer 2 reads the software version from the software version field 43: (step 17, step 18), stores it in the internal memory 17, reads out the address table (containing the memory address of information stored in the RAM 7) stored in the external memory 22 in correspondence to the version number, and displays it on the display unit 21 for the search: (step 19). This embodiment is designed to search the memory address of the auto-dial information c.

Next, the writing procedure will be explained. When the NSF, CSI and DIS signals are sent again from the facsimile unit 1 (these signals are sent at a constant interval), the host computer 2 implements data writing: (step 8) by entering the startaddress and data through the operation of the input unit 18: (step 13), stores them in the internal memory 17, sets the start address field 41, data field 43 and data read/write designation field 39, and sends them as the NSS signal: (step 14).

As an example, in FIG. 5, the memory start address is 9000H, data of the abbreviated number C1 is 000 and of the designation telephone number C2 is 01-234-5678, and the destination party name C3 is Araishouten, and they can be entered easily and accurately through the input unit 18 of the host computer 2.

The facsimile unit 1, upon detecting the NSS signal by the CPU 5: (step 34), checks the hardware dip switch 14 for access inhibit selection: (step 35), and, if access is enabled, stores the above data in the record $T_0$ of the destination information table at the start address: (step 36). It should be noted that through the batch transmission for many of the destination information records $T_0$–$T_n$ from the host computer 2 in FIG. 5, the setting operation can further be sped up.

This embodiment is further provided with a confirmation procedure for confirming whether the above-mentioned settings have been done correctly. In the host computer 2, the start address and data in accordance with the above-mentioned writing procedure are stored in the internal memory 17, and it enters the start address and the number of bytes of data, sets the start address field 36, byte width field 37 and data read/write designation field 34: (step 11), sends them as the NSC signal: (step 12). The facsimile unit 1 reads data at the start address of the start address field 36 in the RAM 7: (step 33), sets it in the data field 43 of the NSS signal, and sends it: (step 31). The host computer 2, upon detecting the NSS signal: (step 15), reads data in the data field 43 of the NSS signal, stacks the data temporarily in the internal memory 17: (step 20), and check the write data and read data in the internal memory 17 in step 21 thereby to confirm the settings in the above writing procedure.

Upon completion of setting: (step 23), the host computer 2 sends a line disconnection command DCN: (step 24), and in response to the reception of the DCN signal: (step 42) by the facsimile unit 1, the entire communication terminates.

As described above, this embodiment is provided with the hardware dip switch 14 for setting the selection of access inhibit position for the security of the user of the facsimile unit 1. In the flowcharts of FIGS. 2 and 3, with the hardware dip switch being set to the access inhibit position in step 32 or step 35, when the facsimile unit 1 sends the NSS signal, with its access inhibit field 40 being set,: (step 37, step 38), the step 16 detects the field 40 of the NSS signal to confirm the access inhibition. At completion of data writing in step 36, when the facsimile unit 1 sends the NSS signal, with its access inhibit field 40 being reset,: (step 39), the step 17 detects the field 40 of the NSS signal to confirm the end of data writing.

Upon confirmation of reception of the response signal NSC or NSS signal from the host computer 2 in step 27 or the reception of the digital command signal DCS in step 40, the usual facsimile procedure (step 41) is restored. Step 3 is the confirmation of reception of the command signals CSI, NSF and NSS from the facsimile unit 1, and step 22 is the operation of input from the host computer 2, e.g., prior creation of the content of settings, emergency halt command, etc.

Although an embodiment of the present invention has been described for a series of procedures including the reading procedure, writing procedure and confirmation procedure (see FIG. 4), it may be carried out by eliminating the confirmation procedure or by adopting only the reading procedure.

According to this embodiment, as described above, it becomes possible to set various functions of the facsimile unit 1 on the input unit of the host computer 2 by way of the telephone line 4 on the remote control basis, which allows easy and accurate setting and prevents troubles of facsimile communication caused by erroneous setting. In addition, the service personnel is rid of being dispatched for the setting, whereby the labor can be saved advantageously. The foregoing setting is not only applicable to the installation of a facsimile unit, but it is also useful for the alteration of settings in the ordinary use.

Because of the provision of the hardware dip switch 14, etc. (privacy protection means) for setting the selection of access inhibition on the facsimile unit 1, the user's security can be protected.

Although in this embodiment the facsimile interface 3 is incorporated in the host computer 2, the host computer 2 and facsimile interface 3 may be equipped separately and connected through a connecting interface (e.g., RS-232C).

The setting of various functions based on this invention is not limited to the input (registration or alteration) for such as the auto-dial information c, but by reading out the communication management report e so that it is under control of the host computer 2, the operational state (e.g., occurrence of transmission/reception error and trouble) of the facsimile unit 1 can be collected for carrying out a preventive maintenance and the like.

As described above in detail, the present invention enables the facsimile unit to have its settings of various functions through the input operation on the host computer in connection with it through the telephone line, whereby setting can be done easily and accurately and troubles of facsimile communication caused by erroneous inputs can be prevented.

What is claimed is:

1. A facsimile communication system comprising:
   a facsimile unit having storage means for storing a plurality of selectively alterable operating parameters for controlling the operation of the facsimile unit;
   a host computer connected to said facsimile unit through a telephone line;
   means for reading the operating parameters of said facsimile unit with said host computer over the telephone line;
   an input device connected to said host computer; and
   means for altering at least one operating parameter in said storage means of said facsimile unit with said input device over the telephone line.

2. The facsimile communication system as claimed in claim 1, wherein said facsimile unit is provided with a hardware dip switch for setting a selection of access inhibition for the security of the user of the facsimile unit.

3. The facsimile communication system as claimed in claim 2, wherein said host computer includes a facsimile interface comprising of a network controller connected to the telephone line, and a modulator/demodulator so that signal transaction takes place between the facsimile unit and the host computer through the facsimile interface.

4. The facsimile communication system as claimed in claim 2, wherein said host computer includes means for setting an operating parameter of said facsimile unit and means for providing a parameter writing procedure.

5. A facsimile communication system operable with a telephone line, the system comprising:
- a facsimile unit operable in accordance with a plurality of selectively alterable operating parameters, the facsimile unit having a storage device for storing data corresponding to the operating parameters;
- a computer connected to the facsimile unit through the telephone line, the computer having means for reading data stored in the storage device of the facsimile unit over the telephone line and means for altering the data corresponding to the operating parameters stored in the storage device of the facsimile uit over the telephone line.

6. A facsimile communication system as claimed in claim 5, wherein the facsimile unit further comprises a switch having a first switch position and connected so as to inhibit the means for reading from reading data stored in the storage device upon the switch being in the first switch position.

7. A facsimile communication system as claimed in claim 5, wherein the facsimile unit further comprises means for selectively inhibiting the means for reading from reading data stored in the storage device.

8. A facsimile communication system as claimed in claim 5, further comprising a first modem and a first NCU for connecting the facsimile unit to the telephone line and a second modem and a second NCU for connecting the computer to the telephone line.

9. A facsimile communication method fore communication over a telephone line between a host computer and a facsimile unit operable according to preset operating parameters, the method comprising the steps of:
- connecting the host computer to the facsimile unit through the telephone line; and
- setting an operating parameter of the facsimile unit over the telephone line with the host computer, wherein the step of setting comprises a reading procedure for reading an operating parameter of the facsimile unit and a writing procedure for writing an operating parameter of the facsimile unit.

10. The facsimile communication system as claimed in claim 9, wherein said reading procedure includes steps of sending a software version filed of a non-standard function command signal to the facsimile unit upon detecting a called exchange station identification signal and a non-standard function identification signal indicative of the optional function by a main controller of the host computer, extracting the software version field of the non-standard function setting signal and sending it to the host computer upon detecting the software version field of the non-standard function command signal by a main controller of the facsimile unit, and reading the software version from the software version field, storing it in an internal memory and displaying it on a display unit if the host computer upon detecting the non-standard function setting signal by the host computer.

11. The facsimile communication method as claimed in claim 9, where said step of setting a parameter of the facsimile unit further includes a step of confirming whether the setting has been done correctly.

12. The facsimile communication method as claimed in claim 11, wherein said confirmation step comprises steps of repeating the reading procedure and the writing procedure as to the start address and data and checking the write data and read data in an internal memory of the host computer thereby to confirm the settings in the writing procedure.

13. A facsimile communication method as claimed in claim 9 wherein the facsimile unit has a hardware dip switch for selectively inhibiting altering of an operating function of the facsimile unit.

14. The facsimile communication system as claimed in claim 13, wherein said writing procedure includes data writing by entering a start address and data and storing them in an internal memory when the non-standard function identification signal and the called exchange station identification signal are sent again from the facsimile unit; sending the start address and data as the non-standard function setting signal to the facsimile unit; and checking the hardware dip switch for access inhibit selection and storing the data in the facsimile unit if access is enabled.

15. A facsimile communication method for communication over a telephone line between a host computer having an input device and a facsimile unit operable in accordance with a plurality of selectively alterable operating parameters which are stored in a storage device within the facsimile unit, the method comprising the steps of:
- connecting the host computer to the facsimile unit through the telephone line; and
- reading the plurality of selectively alterable operating parameters of the facsimile unit over the telephone line with the host computer; and
- altering at least one operating parameter of the facsimile unit over the telephone line with the input device of the host computer.

* * * * *